United States Patent
Eitzman et al.

(12)

(10) Patent No.: US 6,406,657 B1
(45) Date of Patent: Jun. 18, 2002

(54) METHOD AND APPARATUS FOR MAKING A FIBROUS ELECTRET WEB USING A WETTING LIQUID AND AN AQUEOUS POLAR LIQUID

(75) Inventors: Philip D. Eitzman, Lake Elmo; Alan D. Rousseau, Stillwater, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/415,291

(22) Filed: Oct. 8, 1999

(51) Int. Cl.[7] .............................. D06B 3/00; B01D 39/16
(52) U.S. Cl. ....................... 264/340; 264/436; 427/121; 427/434.4; 307/400
(58) Field of Search ................................ 162/136, 146, 162/157.1, 157.2, 157.3, 157.4, 157.5, 157.6, 157.7, 158, 164.1, 183, 184; 264/340, 349, 448, 423, 454, 232; 427/434.4, 430.1, 434.3, 458, 601, 434.2, 538; 96/99; 307/400; 55/527, 528; 428/221

(56) References Cited

U.S. PATENT DOCUMENTS

| | | | |
|---|---|---|---|
| 3,366,721 A | | 1/1968 | Burdge et al. ............... 264/129 |
| 3,793,715 A | * | 2/1974 | Murayama et al. ........... 29/592 |
| 3,959,421 A | | 5/1976 | Weber et al. .................. 264/6 |
| 4,118,531 A | | 10/1978 | Hauser ........................ 428/224 |
| 4,204,828 A | | 5/1980 | Peckinpaugh et al. ......... 425/72 |
| 4,215,682 A | | 8/1980 | Kubik et al. ........... 128/205.29 |
| 4,277,430 A | | 7/1981 | Peckinpaugh et al. ...... 264/129 |
| 4,288,584 A | | 9/1981 | Mishra ..................... 526/348.4 |
| RE30,782 E | | 10/1981 | van Turnhout ............... 264/22 |
| 4,340,563 A | | 7/1982 | Appel et al. ................. 264/518 |
| RE31,285 E | | 6/1983 | van Turnhout et al. ........ 55/155 |
| 4,515,007 A | * | 5/1985 | Herman .......................... 73/38 |
| 4,536,440 A | | 8/1985 | Berg .......................... 428/284 |

(List continued on next page.)

FOREIGN PATENT DOCUMENTS

| | | | |
|---|---|---|---|
| JP | 60-947 | 1/1985 | |
| JP | 60-15137 | 4/1985 | |
| JP | 63132625 | * 6/1988 | ........... A47L/13/16 |
| WO | WO 95/22646 | 8/1995 | .......... D04H/13/00 |
| WO | WO 96/00093 | 1/1996 | ............. Q61L/2/20 |
| WO | WO 97/07272 | * 2/1997 | ............ D04H/1/42 |

OTHER PUBLICATIONS

Japan Technology Highlights, Removal of Static Electricity with Water Spray, v.6, n. 23, pp. 5–6 (Nov. 15, 1995).

Chudleigh, P.W., Charging of Polymer Foils Using Liquid Contacts, Appl. Phys. Lett., v. 21, n. 11 (Dec. 1, 1972).

Chudleigh, P.W., Mechanism of Charge Transfer to a Polymer Surface by a Conducting Liquid Contact, Journal of Applied Physiscs, v. 47, n. 10 (Oct. 1976).

Quin, G–W. et al., The Effect of Water–quenching on the Electrostatic Charging of Fibers and Fabrics During the Melt–blowing Process, J. Text. Inst. 1999, Part 1, No. 2

Strobel, M. et al., Plasma Fluorination of Polyolefins, Journal of Polymer Science: Part A: Polymer Chemistry, v. 25, 1295–1307 (1987).

Wente, Van A., Superfine Thermoplastic Fibers, Industrial and Engineering Chemistry, v. 48, n. 8, pp–1342–1346 (Aug. 1956).

Yatsuzuka, K. et al., Electrification of Polymer Surface Caused by Sliding Ultrapure Water, IEEE Transactions on Industry Applications, v. 32, n. 4 (Jul./Aug. 1996)

*Primary Examiner*—Peter Chin
*Assistant Examiner*—Eric Hug
(74) *Attorney, Agent, or Firm*—Karl G. Hanson (57) ABSTRACT

A method for imparting an electrostatic charge to a nonwoven fibrous web 20. The fibrous web 20 is wetted with a wetting liquid 24, followed by being saturated with an aqueous polar liquid 30 and drying 31. The resulting dried product is an electret article 43 that could be used as an air filter in, for example, a respirator 50.

46 Claims, 2 Drawing Sheets

U.S. PATENT DOCUMENTS

| | | | |
|---|---|---|---|
| 4,548,628 A | 10/1985 | Miyake et al. | 55/487 |
| 4,588,537 A | 5/1986 | Klaase et al. | 264/22 |
| RE32,171 E | 6/1986 | van Turnhout | 55/155 |
| 4,592,815 A | 6/1986 | Nakao | 204/165 |
| 4,594,202 A | 6/1986 | Pall et al. | 264/8 |
| 4,652,282 A | 3/1987 | Ohmori et al. | 55/155 |
| 4,789,504 A | 12/1988 | Ohmori et al. | 264/22 |
| 4,798,850 A | 1/1989 | Brown | 521/134 |
| 4,874,399 A | 10/1989 | Reed et al. | 55/2 |
| 4,874,659 A | 10/1989 | Ando et al. | 428/221 |
| 4,931,230 A | 6/1990 | Krueger et al. | 264/6 |
| 4,950,549 A | 8/1990 | Rolando et al. | 428/500 |
| 5,057,710 A | 10/1991 | Nishiura et al. | 307/400 |
| 5,078,925 A | 1/1992 | Rolando et al. | 264/6 |
| 5,151,321 A * | 9/1992 | Reeves et al. | 428/286 |
| 5,254,378 A | 10/1993 | Krueger et al. | 428/34.1 |
| 5,280,406 A | 1/1994 | Coufal et al. | 361/225 |
| 5,370,830 A | 12/1994 | Jameson et al. | 264/23 |
| 5,401,446 A | 3/1995 | Tsai et al. | 264/22 |
| 5,411,576 A | 5/1995 | Jones et al. | 95/57 |
| 5,472,481 A | 12/1995 | Jones et al. | 96/15 |
| 5,496,507 A | 3/1996 | Angadivand et al. | 264/423 |
| 5,525,397 A | 6/1996 | Shizuno et al. | 428/138 |
| 5,592,357 A | 1/1997 | Rader et al. | 361/225 |
| 5,645,627 A * | 7/1997 | Lifshutz et al. | 96/15 |
| 5,665,278 A | 9/1997 | Allen et al. | 264/6 |
| 5,705,219 A * | 1/1998 | Besenhard et al. | 427/96 |
| 5,780,153 A | 7/1998 | Chou et al. | 428/359 |
| 5,834,384 A * | 11/1998 | Cohen et al. | 442/382 |
| 5,908,598 A * | 6/1999 | Rousseau et al. | 264/344 |
| 5,919,847 A | 7/1999 | Rousseau et al. | 524/89 |
| 5,968,635 A | 10/1999 | Rousseau et al. | 428/198 |
| 5,976,208 A | 11/1999 | Rousseau et al. | 55/385.3 |

* cited by examiner

METHOD AND APPARATUS FOR MAKING A FIBROUS ELECTRET WEB USING A WETTING LIQUID AND AN AQUEOUS POLAR LIQUID

The present invention relates to a method of charging a fibrous web by wetting it with a wetting agent and then contacting it with an aqueous polar liquid, followed by drying. The invention also pertains to an apparatus that is useful for carrying out the inventive method.

BACKGROUND

Electrically-charged nonwoven webs are commonly used as filters in respirators to protect the wearer from inhaling airborne contaminants. U.S. Pat. Nos. 4,536,440, 4,807,619, 5,307,796, and 5,804,295 disclose examples of respirators that use these filters. The electric charge enhances the ability of the nonwoven web to capture particles that are suspended in a fluid. The nonwoven web captures the particles as the fluid passes through the web. The nonwoven web typically contains fibers that comprise dielectric—that is, nonconductive—polymers. Electrically-charged dielectric articles are often referred to as "electrets", and a variety of techniques have been developed over the years for producing these products.

Early work relating to electrically-charging polymer foils is described by P. W. Chudleigh in *Mechanism of Charge Transfer to a Polymer Surface by a Conducting Liquid Contact*, 21 APPL. PHYS. LETT., 547–48 (Dec. 1, 1972), and in *Charging of Polymer Foils Using Liquid Contacts*, 47 J. APPL. PHYS., 4475–83 (October 1976). Chudleigh's method involves charging a polyfluoroethylene polymer foil by applying a voltage to the foil. The voltage is applied through a conducting liquid that contacts the foil surface.

An early-known technique for making a polymeric electret in fibrous form is disclosed in U.S. Pat. No. 4,215,682 to Kubic and Davis. In this method, the fibers are bombarded with electrically-charged particles as they issue from a die orifice. The fibers are created using a "melt-blowing" process, where a stream of gas, which is blown at high velocity next to the die orifice, draws out the extruded polymeric material and cools it into a solidified fiber. The bombarded melt-blown fibers accumulate randomly on a collector to create the fibrous electret web. The patent mentions that filtering efficiency can be improved by a factor of two or more when the melt-blown fibers are electrically-charged in this fashion.

Fibrous electret webs also have been produced by charging them with a corona. U.S. Pat. No. 4,588,537 to Klaase et al., for example, shows a fibrous web that is continuously fed into a corona discharge device while positioned adjacent to one major surface of a substantially-closed dielectric foil. The corona is produced from a high-voltage source that is connected to oppositely-charged thin tungsten wires. Another high-voltage technique for imparting an electrostatic charge to a nonwoven web is described in U.S. Pat. No. 4,592,815 to Nakao. In this charging process, the web is brought into tight contact with a smooth-surfaced ground electrode.

Fibrous electret webs also may be produced from polymer films or foils, as described in U.S. Patents Re. 30,782, Re. 31,285, and Re. 32,171 to van Turnhout. The polymer films or foils are electrostatically charged before being fibrillated into fibers that are subsequently collected and processed into a nonwoven fibrous filter.

Mechanical approaches too have been used to impart an electric charge to fibers. U.S. Pat. No. 4,798,850 to Brown describes a filter material that contains a mixture of two different crimped synthetic polymer fibers that have been carded into a fleece and then needled to form a felt. The patent describes mixing the fibers well so that they become electrically-charged during the carding. The process disclosed in Brown is commonly referred to as "tribocharging".

Tribocharging also can occur when high-velocity uncharged jets of gases or liquids are passed over the surface of a dielectric film. In U.S. Pat. No. 5,280,406, Coufal et al. disclose that when jets of an uncharged fluid strike the surface of the dielectric film, the surface becomes charged.

A more recent development uses water to impart electric charge to a nonwoven fibrous web (see U.S. Pat. No. 5,496,507 to Angadjivand et al.). Pressurized jets of water or a stream of water droplets are impinged onto a nonwoven web that contains nonconductive microfibers to create the electric charge. The resulting charge provides filtration-enhancing properties. Subjecting the web to an air corona discharge treatment before the hydrocharging operation can further enhance charging.

Adding certain additives to the web has improved the performance of electrets. An oily-mist resistant electret filter media, for example, has been provided by including a fluorochemical additive in melt-blown polypropylene microfibers; see U.S. Pat. Nos. 5,411,576 and 5,472,481 to Jones et al. The fluorochemical additive has a melting point of at least 25° C. and a molecular weight of about 500 to 2500.

U.S. Pat. No. 5,908,598 to Rousseau et al. describes a method where an additive is blended with a thermoplastic resin to form a fibrous web. Jets of water or a stream of water droplets are impinged onto the web at a pressure sufficient to provide the web with filtration-enhancing electret charge. The web is subsequently dried. The additives may be (i) a thermally stable organic compound or oligomer, which compound or oligomer contains at least one perfluorinated moiety, (ii) a thermally stable organic triazine compound or oligomer which contains at least one nitrogen atom in addition to those in the triazine group, or (iii) a combination of (i) and (ii).

Other electrets that contain additives are described in U.S. Pat. No. 5,057,710 to Nishiura. The polypropylene electrets disclosed in Nishiura contain at least one stabilizer selected from hindered amines, nitrogen-containing hindered phenols, and metal-containing hindered phenols. The patent discloses that an electret that contains these additives can offer high heat-stability. The electret treatment was carried out by placing the nonwoven fabric sheet between a needle-like electrode and an earth electrode. U.S. Pat. Nos. 4,652, 282 and 4,789,504 to Ohmori et al. describe incorporating a fatty acid metal salt in an insulating polymer to maintain high dust-removing performance over a long period of time. Japanese Patent Kokoku JP60-947 describes electrets that comprise poly 4-methyl-1-pentene and at least one compound selected from (a) a compound containing a phenol hydroxy group, (b) a higher aliphatic carboxylic acid and its metal salts, (c) a thiocarboxylate compound, (d) a phosphorous compound, and (e) an ester compound. The patent indicates that the electrets have long-term storage stability.

A recently-published U.S. patent discloses that filter webs can be produced without deliberately post-charging or electrizing the fibers or the fiber webs (see U.S. Pat. No. 5,780,153 to Chou et al.). The fibers are made from a copolymer that comprises: a copolymer of ethylene, 5 to 25 weight percent of (meth)acrylic acid, and optionally, though less preferably, up to 40 weight percent of an alkyl (meth)

acrylate whose alkyl groups have from 1 to 8 carbon atoms. Five to 70% of the acid groups are neutralized with a metal ion, particularly an ion of zinc, sodium, lithium, or magnesium, or a mixture of these. The copolymer has a melt index of 5 to 1000 grams (g) per 10 minutes. The remainder may be a polyolefin such as polypropylene or polyethylene. The fibers may be produced through a melt-blowing process and may be cooled quickly with water to prevent excess bonding. The patent discloses that the fibers have high static retention of any existing or deliberate, specifically induced, static charge.

SUMMARY OF THE INVENTION

The present invention provides a new method for making a fibrous electret web. In brief summary, the method comprises: wetting a fibrous web, which web comprises nonconductive fibers, with a wetting agent; saturating the wetted web in an aqueous polar liquid; and substantially drying the web. The fibrous web may be a woven web or a nonwoven web, and it may be used as a filter element in a finished article such as a respirator or filter cartridge.

The present method differs from known charging methods in that the web is wetted with a wetting agent before being saturated with an aqueous polar liquid. The inventors discovered that the wetting step is beneficial in that it can allow a better performing filter to be provided as measured by the Quality Factor parameter described below. The wetting step may increase the measured charge density of the fibrous web and thus enable the better performance to be obtained.

As used in this document:

"laqueous" means that the aqueous polar liquid contains at least about 10% water by volume.

"electric charge" means that there is charge separation.

"fibrous" means possessing fibers and possibly other ingredients.

"fibrous electret web" means a web that contains fibers and that exhibits a quasi-permanent electric charge.

"liquid" means the state of matter between a solid and a gas.

"nonconductive" means possessing a volume resistivity of about $10^{14}$ ohm·cm or greater at room temperature (22° C.).

"nonwoven" means a structure or portion of a structure in which fibers are held together by a means other than weaving.

"polar liquid" means a liquid that has a dipole moment of at least about 0.5 Debye and that has a dielectric constant of at least about 10.

"polymer" means an organic material that contains repeating linked molecular units or groups, regularly or irregularly arranged.

"polymeric" means containing a polymer and optionally other ingredients.

"polymeric fiber-forming material" means a composition that contains a polymer, or that contains monomers capable of producing a polymer, and possibly contains other ingredients, and that is capable of being formed into solid fibers.

"quasi-permanent" means that the electric charge resides in the web under standard atmospheric conditions (22° C., 101,300 Pascals atmospheric pressure, and 50% humidity) for a time period long enough to be significantly measurable.

"saturating" means wetting the web with the maximum, or substantially the maximum, amount possible of a liquid.

"web" means a structure that is significantly larger in two dimensions than in a third and that is air permeable.

"wetting" means contacting or coating substantially all the surface area of the web that is desired to be wetted.

"wetting liquid" means a liquid that meets the Wetting Test described below and that dissolves in the aqueous liquid that is used to saturate the web.

DETAILED DESCRIPTION OF PREFERRED EMBODIMENTS

In the present invention, an electrostatic charge is imparted to a fibrous web by wetting it with a wetting agent, saturating it with an aqueous polar liquid, and drying it substantially. The web may be partially dried after wetting with the wetting agent. In one embodiment, the aqueous polar liquid is water. Intimate contact between the web fibers and the aqueous polar liquid may help maximize the electric charge that is imparted to the fibers.

Nonwoven fibrous electret webs that have been produced in accordance with the present invention exhibit at least a quasi-permanent electric charge. Preferably, the nonwoven fibrous electret webs exhibit a "persistent" electric charge, which means that the electric charge resides in the fibers, and hence the nonwoven web, for at least the commonly-accepted useful life of the product in which the electret is employed.

One test for determining filtration performance of a fibrous web is known as the DOP Penetration and Pressure Drop Test, discussed below. The test involves forcing dioctyl phthalate (DOP) particles through the fibrous web and measuring the penetration of the particles through the web and the pressure drop across the web. From the measured DOP penetration and pressure drop, a quality factor (QF) may be calculated. The filtration efficiency of an electret can be generally estimated from an Initial Quality Factor, $QF_i$. An Initial Quality Factor, $QF_i$, is a Quality Factor QF that has been measured before the nonwoven fibrous electret web has been loaded—that is, before the web has been exposed to an aerosol that is intended to be filtered.

Preferred nonwoven fibrous electret webs that are produced according to the invention may possess sufficient electric charge to enable the product to exhibit a $QF_i$ value of greater than 0.2 (millimeters (mm) $H_2O)^{-1}$, more preferably greater than 0.4 (mm $H_2O)^{-1}$, still more preferably greater than 0.7 (mm $H_2O)^{-1}$, and even more preferably greater than 0.9 (mm $H_2O)^{-1}$ when tested according to the DOP Penetration and Pressure Drop Test described below. The initial quality factor of a nonwoven fibrous electret web of the invention preferably exceeds, by at least a factor of 2, the $QF_i$ value of an untreated web of essentially the same construction, and more preferably by a factor of at least 10.

Figure 1:
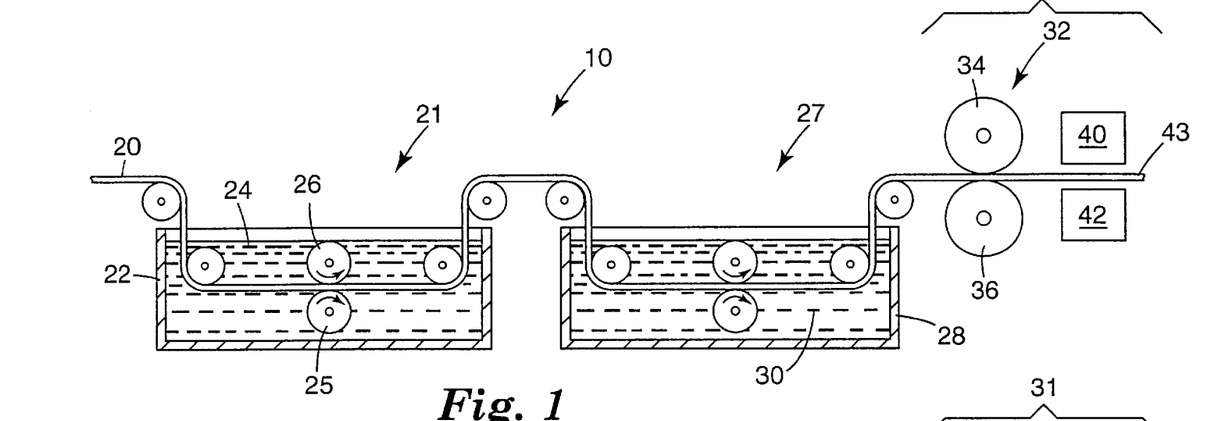
FIG. 1 is a partially-broken schematic side view of an apparatus 10 for wetting and drying a fibrous web 20 in accordance with the present invention.

FIG. 1 schematically illustrates a method for wetting and saturating a fibrous web 20. As shown, the fibrous web 20 is directed to a first mechanism 21 that is adapted to wet 5 the fibrous web 20. The web 20 moves through a series of rollers to a first vessel 22 that contains wetting liquid 24. A nip that comprises rollers 25, 26 compresses and releases the fibrous web 20 while it is submerged in the liquid 24. When the fibrous web 20 re-expands, the wetting agent 24 can better enter the interstitial spaces between the fibers to fully wet the web 20. The nip is beneficial to the wetting step because it assists in removing gas from the web.

After emerging from the first vessel 22, the web 20 then is directed to a second mechanism 27 that is adapted to saturate the fibrous web 20. Web 20 enters a second vessel 28 that contains an aqueous polar liquid 30, which saturates the web 20 in vessel 28, and in so doing makes intimate contact with the fibers in the web 20.

Once the web has been saturated with the aqueous polar liquid, it can be removed from the second vessel 28 so that it can be dried using drying system 31. To dry web 20, it can be directed through a ringer 32 that includes mating rollers 34 and 36. Rollers 34 and 36 squeeze excess liquid from the web 20 before the web passes to an active drying apparatus that includes moisture-removing elements 40, 42 disposed on opposing sides of the web 20.

The active drying apparatus may be an external source that consumes supplied energy for purposes of encouraging all moisture to leave the web. An active drying apparatus may include a heat source such as a flow-through oven, a vacuum source, or an air source such as a convective air apparatus, i.e., a stream of a drying gas. These drying mechanisms may or may not be used in conjunction with mechanical mechanisms such as a centrifuge or rollers to squeeze the polar liquid from the fibrous web. Alternatively, a passive drying mechanism, such as ambient air drying, may be used to dry the fibrous web—although air drying is generally not practical for high speed manufacturing requirements. The invention contemplates essentially any operation or apparatus that is capable of encouraging moisture to leave the web without causing significant structural damage to the final product. The resulting electret web can then be cut into sheets, rolled for storage, or formed into various articles, such as respirators or filters.

The web can be transported through the apparatus by essentially any device that is capable of moving the web from the mechanism 21 to the second mechanism 25 first and then to the drier 31. A driven roller is an example of a transport that may be suitable for this purpose, as well as a conveyor, belt, or nip.

Upon being dried, the nonwoven web possesses sufficient electric charge to qualify as an electret 43. The resulting electret web 43 may also be subjected to further charging techniques that might further enhance the electret charge on the web or might perform some other alteration to the electret charge that could possibly improve filtration performance. For example, the nonwoven fibrous electret web could be exposed to a corona charging operation after (or perhaps before) producing an electret using the process described above. The web could be charged, for example, as described in U.S. Pat. No. 4,588,537 to Klaase et al., or as described in U.S. Pat. No. 4,592,815 to Nakao. Alternatively—or in conjunction with the noted charging techniques—the web could also be further hydrocharged as described in U.S. Pat. No. 5,496,507 to Angadjivand et al. The charge of the fibrous electret web also may be supplemented using charging techniques disclosed in the commonly assigned U.S. Patent applications entitled Method and Apparatus for Making a Nonwoven Fibrous Electret from Free-Fiber and Polar Liquid (Attorney Docket No. 52830USA3A); Method of Making a Fibrous Electret Web Using A Nonaqueous Polar Liquid (Attorney Docket No. 52829USA6A), all filed on the same day as the present document.

Figure 2:
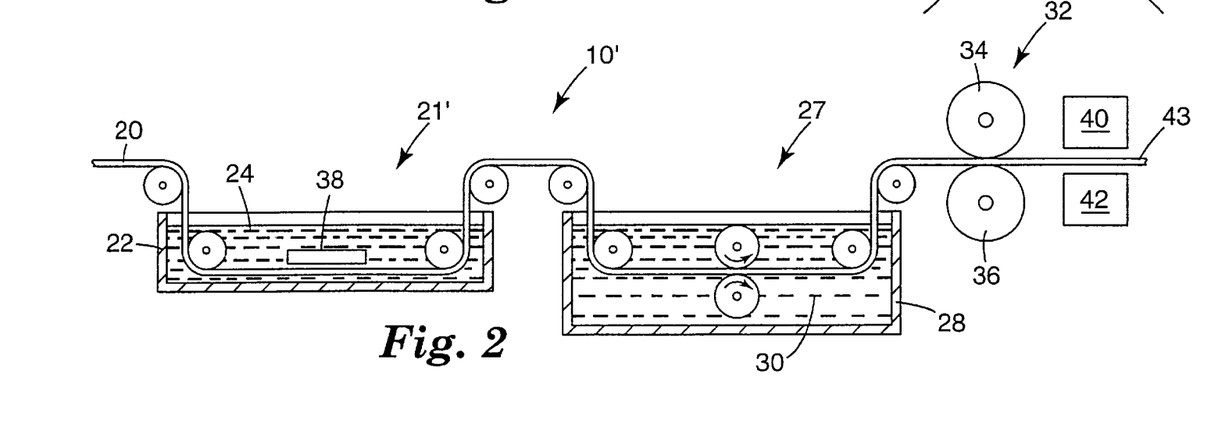
FIG. 2 is a partially-broken schematic side view of an alternate apparatus 10' for wetting a web 20 using pressure-driven flow in accordance with the present invention.

FIG. 2 illustrates an alternate embodiment for wetting and/or saturating the fibrous web 20. Similar to the embodiment shown in FIG. 1, the web 20 travels sequentially from a mechanism 21' that wets the liquid, to a mechanism 25 that saturates the web, and then to a mechanism 31 that dries the web. In this embodiment, however, a vacuum bar 38 encourages the wetting liquid 24 to flow through the fibrous web 20 by creating a low pressure condition on one side of the web 20. The vacuum bar 38 is hollow and is permeable to liquid flow on the side closest to the web 20. The interior of the vacuum bar 38 is held at a pressure sufficiently lower than the vessel 22 so that the wetting liquid will flow through the web 20 and into the vacuum bar 38. Equipment that uses submerged vacuum bars is marketed by TUE-ESCALE Indus. of Flowery Branch, Ga., U.S.A.

Figure 3:
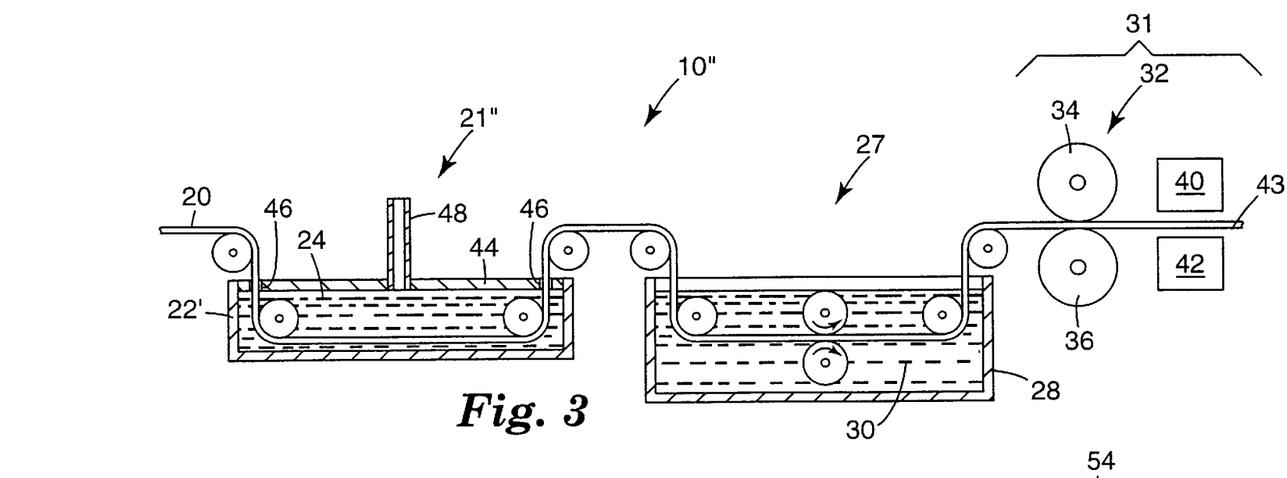
FIG. 3 is a partially-broken schematic side view of another alternate apparatus 10" for wetting a web 20 using pressure in accordance with the present invention.

FIG. 3 illustrates another alternate embodiment in which the fibrous web is sequentially wetted in a first stage 21", followed by being saturated in a second stage 25, which in turn is followed by a drying step 31. At the first mechanism 21", the fibrous web 20 is exposed to the wetting liquid 24 under a high static pressure. The pressurized vessel 22' has a cover 44 that has a pair of slots 46 through which the fibrous web 20 can travel. The elevated pressure in vessel 22' can be maintained or controlled by adding the wetting liquid through port 48, as necessary. As the web enters the vessel 22', any gas trapped in the fibrous web 20 is compressed and occupies a smaller volume. The wetting liquid 24 can flow into the web 20 as the gas is compressed.

In lieu of the nip rollers 25, 26, the vacuum bar 38, or the pressurized vessel 22' described above, sonic or ultrasonic vibrations could be used to wet web 20 with the wetting liquid. A sonic or ultrasonic generator may be used to vibrate the wetting liquid 24 while the web 20 is immersed in the liquid. The vibrations should be of sufficient amplitude to cause any gas trapped in the web 20 to break up into small bubbles that will be easily displaced from the web by the wetting liquid.

Alternatively, the fibrous web may be sprayed with the wetting agent and/or a polar aqueous liquid using the method and apparatus disclosed in U.S. Pat. No. 5,496,507 to Angadjivand et al. Essentially any apparatus or method that helps remove gas from the web is contemplated for use in achieving adequate web wetting. Although the whole web is shown being wetted and saturated in the Figures, this is not necessary for practicing the present invention. It may be desirable, for example, to wet and saturate only portions of a web to create a web that has selected areas that act as an electret.

The relative ease with which a given fibrous web can be wet is dependent on the surface energy of the fibrous web and the surface tension of the wetting liquid. Less work is required to wet a fibrous web with a wetting liquid that has a surface tension that is substantially less than the surface energy of the web, particularly when compared to the work that is required to wet a fibrous web with wetting liquid that has a surface tension that is equal to or greater than the surface energy of the web. The wetting liquid preferably has a surface tension that is less than the surface energy of the fibrous web, and more preferably is at least 5 dynes per centimeter (dynes/cm) less than the surface energy of the fibrous web.

A liquid that qualifies as a "wetting liquid" is one that satisfies the Wetting Test. The Wetting Test is performed as follows. First, a dry test specimen is placed on a smooth, horizontal surface. A small drop—approximately 5 millimeters in diameter (0.05 ml volume)—is placed on the test specimen using a dropping bottle. The drop is observed for 10 seconds. If the drop substantially soaks into the web within this time frame, then the liquid qualifies as a wetting liquid. Preferably the drop will soak into the web—that is, satisfy the Wetting Test—within about 5 seconds, and more preferably within about 2 seconds. The wetting liquid also is capable of dissolving in the aqueous liquid that is used to saturate the web. The wetting liquid should be capable of yielding a single phase when dissolved in the aqueous liquid.

The surface tension of the aqueous polar liquid plays an important role in imparting an electric charge to the fibrous web. Effective charging may be difficult to establish unless the surface tension of the aqueous polar liquid is greater than the surface energy of the fibrous web. The surface tension of the polar aqueous liquid is preferably 5 dynes/cm greater than the surface energy of the fibrous web and more preferably 10 dynes/cm greater than the surface energy of the fibrous web. Polypropylene is a polymer that is commonly used to create melt-blown fibrous webs. It has a surface energy of about 30 dynes/cm. In webs that have more than one type of fiber, the fiber with the higher surface energy might be charged more than fibers with a lower surface energy.

A wetting liquid can facilitate the wetting of fibrous webs with an aqueous polar liquid by removing trapped gas. Useful wetting liquids may include solutions of surfactants, such as detergents, in polar aqueous liquids. The surfactant can be a nonionic surfactant such as t-octylphenoxypolyethoxyethanol, an anionic surfactant such as sodium lauryl sulfate, or a cationic surfactant such as alkyldimethylbenzylammonium chloride. Other wetting liquids may include water-miscible solvents that can wet a nonwoven web in pure form or as part of an aqueous solution due to the low surface tension of the solvent. Preferably, the wetting liquid can be an alcohol such as isopropanol, ethanol, methanol, 2-propanol, or a ketone such as acetone, or combinations of the alcohols and/or ketones. The wetting liquid may also include the use of alcohols or ketones by themselves or in conjunction with water as an aqueous solution.

The method of the invention can be carried out in a batchwise process, which involves a stepwise soaking of the web in the wetting liquid, followed by being submerged in an aqueous polar liquid for a designated period of time, removing the web from the aqueous polar liquid, and then allowing the web to dry. Energy or mechanical work can be applied to the wetting liquid, aqueous polar liquid, and/or the fibrous web to improve wetting and/or saturation as discussed above. The use of these procedures can enable the electret web to be produced continuously.

For applications where the steps of wetting or saturating are performed by mechanical methods such as spraying the wetting liquid and/or aqueous polar liquid onto the web, or agitating the web in the presence of these fluids, the velocity of the wetting liquid and/or aqueous polar liquid relative to the nonwoven web is preferably less than about 50 meters/second (m/s), and more preferably less than about 25 m/s. Lower velocities are generally desirable to avoid damaging the web, which may occur when the web is relatively delicate—for example, a web that contains melt-blown microfibers. Nonwoven fibrous webs that contain microfibers can be damaged if excess energy or mechanical work is used to achieve liquid wetting or saturation. Care therefore should be taken when handling a microfiber-containing web.

Preferably, the wetting liquid is in contact with the nonwoven web for at least 0.001 seconds, more preferably for at least 1 to 10 seconds in a continuous process before contacting the web with the aqueous polar liquid. The aqueous polar liquid is preferably wetted on the fibers of the fibrous web for at least 0.001 seconds, and typically for 1 second to 5 minutes.

Aqueous polar liquids suitable for use in the present method have a dipole moment of at least 0.5 Debye, and more preferably at least 0.75 Debye, and still more preferably at least 1.0 Debye. The dielectric constant is at least 10, preferably at least 20, and more preferably at least 40. Aqueous polar liquids that have higher dielectric constants tend to create webs that show greater filtration performance enhancement. Examples of nonaqueous components that may be used in the aqueous polar liquids include methanol, ethylene glycol, dimethyl sulfoxide, dimethylformamide, acetonitrile, and acetone, among others. The aqueous polar liquid and the wetting agent preferably do not leave a conductive, non-volatile residue that would mask or otherwise dissipate charge on the web.

Water has a dipole moment of about 1.85 and a dielectric constant of about 78 to 80. The aqueous polar liquid comprises at least 10 volume % water, more preferably at least 30 volume % water, still more preferably at least 50 volume % water, and even more preferably at least 80 volume % water. One hundred % water may also be used. Water is a preferred polar liquid because it is inexpensive, and no significant dangerous or harmful vapors or pollutants are generated when it contacts the molten or semi-molten fiber-forming material. Preferably purified water, made through, for example, distillation, reverse osmosis, or deionization, is used in the present invention rather than simply tap water. Purified water is preferred because non-pure water can hinder effective fiber charging.

Webs suitable for use in this present invention may be made from a variety of techniques, including air laid processes, wet laid processes, and melt blown processes such as described in Van A. Wente, *Superfine Thermoplastic Fibers*, 48 INDUS. ENGN. CHEM. 1342–46 and in Report No. 4364 of the Naval Research Laboratories, published May 25, 1954, entitled *Manufacture of Super Fine Organic Fibers* by Van A. Wente et al. Microfibers, particularly meltblown microfibers, are particularly suitable for use in fibrous webs that are used as filters. "Microfiber" means fiber(s) that have an effective diameter of about 25 micrometers or less. Effective fiber diameter can be calculated using equation number 12 in Davies, C. N., *The Separation of Airborne Dust and Particles*, INST. MECH. ENGN., LONDON PROC. 1B (1952). For filtering applications, the microfibers preferably have an effective fiber diameter of less than about 20 micrometers, and more preferably about 1 to about 10 micrometers.

Staple fibers may also be combined with the microfibers to provide a more lofty, less dense web. Reducing web density can reduce the pressure drop across the web. Lower pressure drops are desirable in personal respirators because it can make the respirator more comfortable to wear. Preferably, no more than about 90 weight percent staple fibers are present, more preferably no more than about 70 weight percent. Webs that contain staple fibers are disclosed in U.S. Pat. No. 4,118,531 to Hauser.

For filtration applications, the nonwoven web preferably has a basis weight less than about 500 grams/meter$^2$ (g/m$^2$), more preferably about 5 to about 400 g/m², and still more preferably about 20 to 100 g/m². In making melt-blown fiber webs, the basis weight can be controlled, for example, by changing either die throughput or collector speed. The thickness of the nonwoven web for many filtration applications is about 0.25 to about 20 millimeters (mm), more typically about 0.5 to about 4 mm. The nonwoven web preferably has a solidity (a unitless parameter that defines the solids fraction in the web) of at least 0.03, more preferably about 0.04 to about 0.15, and still more preferably about 0.05 to about 0.1. The inventive method can impart a generally uniform charge distribution throughout the resulting nonwoven web, without regard to basis weight, thickness, or solidity of the resulting media.

Active particulate also may be included in the electret webs for various purposes, including sorbent purposes, catalytic purposes, and others. U.S. Pat. No. 5,696,199 to Senkus et al. describes various active particulate that may be suitable. Active particulate that has sorptive properties—such as activated carbon or alumina—may be included in the web to remove organic vapors during filtration operations. The active particulate may be present in general in amounts up to about 80 volume percent of the contents of the web. Particle-loaded nonwoven webs are described, for example, in U.S. Pat. Nos. 3,971,373 to Braun, U.S. Pat. No. 4,100, 324 to Anderson, and U.S. Pat. No. 4,429,001 to Kolpin et al.

Polymers, which may be suitable for use in producing fibers that are useful in this invention, include thermoplastic organic nonconductive polymers. These polymers are generally capable of retaining a high quantity of trapped charge and are capable of being processed into fibers, such as through a melt-blowing apparatus or a spun-bonding apparatus. The term "thermoplastic" refers to a polymeric material that softens when exposed to heat. The term "organic" means the backbone of the polymer includes carbon atoms. Preferred polymers include polyolefins, such as polypropylene, poly-4-methyl-1-pentene, blends or copolymers containing one or more of these polymers, and combinations of these polymers. Other polymers may include polyethylene, other polyolefins, polyvinylchlorides, polystyrenes, polycarbonates, polyethylene terephthalate, other polyesters, and combinations of these polymers and other nonconductive polymers.

The fibers may be made from these polymers in conjunction with other suitable additives. The fibers also may be extruded or otherwise formed to have multiple polymer components. See U.S. Pat. No. 4,729,371 to Krueger and Dyrud and U.S. Pat. Nos. 4,795,668, and 4,547,420 to Krueger and Meyer. The different polymer components may be arranged concentrically or longitudinally along the length of the fiber to create, for example, bicomponent fibers. The fibers may be arranged to form a macroscopically homogeneous web, which is a web that is made from fibers that each have the same general composition.

The fibers used in the invention do not need to contain ionomers, particularly metal ion neutralized copolymers of ethylene and acrylic or methacrylic acid or both to produce a fibrous product suitable for filtration applications. Nonwoven fibrous electret webs can be suitably produced from the polymers described above without containing 5 to 25 weight percent (meth)acrylic acid with acid groups partially neutralized with metal ions.

The performance of the electret web can be enhanced by including additives in fiber-forming material before contacting it to a polar liquid. Appropriate additives can be added to the fiber-forming material before the fibers are produced. Preferably, an "oily-mist performance enhancing additive" is used in conjunction with the fibers or the fiber-forming materials. An "oily-mist performance enhancing additive" is a component which, when added to the fiber-forming material, or for example, is placed on the resulting fiber, is capable of enhancing the oily aerosol filtering ability of the nonwoven fibrous electret web.

Fluorochemicals can be added to the polymeric material to enhance electret performance. U.S. Pat. Nos. 5,411,576 and 5,472,481 to Jones et al. describe the use of a melt-processable fluorochemical additive that has a melt temperature of at least 25° C. and has a molecular weight of about 500 to 2500. This fluorochemical additive may be employed to provide better oily-mist resistance. One additive class that is known to enhance electrets that have been charged with water jets are compounds that have a perfluorinated moiety and a fluorine content of at least 18% by weight of the additive—see U.S. Pat. No. 5,908,598 to Rousseau et al. An additive of this type is a fluorochemical oxazolidinone described in U.S. Pat. No. 5,411,576 as "Additive A" of at least 0.1% by weight of the thermoplastic material.

Other possible additives are thermally stable organic triazine compounds or oligomers, which compounds or oligomers contain at least one nitrogen atom in addition to those in the triazine ring. Another additive known to enhance electrets charged by jets of water is Chimassorb™ 944 LF (poly[[6-(1,1,3,3,-tetramethylbutyl) amino]-s-triazine-2,4-diyl][[(2,2,6,6-tetramethyl-4-piperidyl) imino] hexamethylene [(2,2,6,6-tetramethyl-4-piperidyl) imino]]), available from Ciba-Geigy Corp. Chimassorb™ 944 and "Additive A" may be combined. Preferably the additive Chimassorb™ and/or the above additives are present in an amount of about 0.1% to about 5% by weight of the polymer; more preferably, the additive(s) is present in an amount from about 0.2% to about 2% by weight of the polymer; and still more preferably is present in an amount from about 0.2 to about 1 weight % of the polymer. Some other hindered amines are also known to increase the filtration-enhancing charge imparted to the web site.

Fibers that contain additives can be quenched after shaping a heated molten blend of the polymer and additive—followed by annealing and charging steps—to create an electret article. Enhanced filtration performance can be imparted to the article by making the electret in this manner—see U.S. patent application Ser. No. 08/941,864, which corresponds to International Publication WO 99/16533. Additives also may be placed on the web after its formation by, for example, using the surface fluorination technique described in U.S. patent application Ser. No. 09/109,497, filed Jul. 2, 1998 by Jones et al.

The polymeric fiber-forming material has a volume resistivity of $10^{14}$ ohm·cm or greater at room temperature. Preferably, the volume resistivity is about $10^{16}$ ohm·cm or greater. Resistivity of the polymeric fiber-forming material can be measured according to standardized test ASTM D 257-93. The fiber-forming material used to form the melt blown fibers also should be substantially free from components such as antistatic agents, which could increase the electrical conductivity or otherwise interfere with the fiber's ability to accept and hold electrostatic charges.

Nonwoven webs of this invention may be used in filtering masks that are adapted to cover at least the nose and mouth of a wearer.

Figure 4:
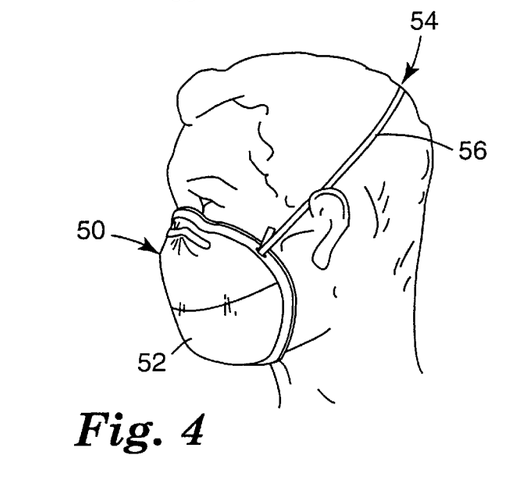
FIG. 4 is an example of a filtering face mask 50 that can utilize an electret filter medium that has been produced in accordance with the present invention.

FIG. 4 illustrates a filtering face mask 50 that may be constructed to contain an electrically-charged nonwoven web that is produced according to the present invention. The generally cup-shaped body portion 52 is adapted to fit over the mouth and nose of the wearer. A strap or harness system 54 may be provided to support the mask 50 on the wearer's face. Although a single strap 56 is illustrated in FIG. 4, the harness 54 may employ more than one strap 56 and may come in a variety of configurations—see, for example, U.S. Pat. No. 4,827,924 to Japuntich et al., U.S. Pat. No. 5,237, 986 to Seppalla et al., and U.S. Pat. No. 5,464,010 to Byram.

Examples of other filtering face masks where nonwoven fibrous electret webs may be used include U.S. Pat. No. 4,536,440 to Berg, U.S. Pat. No. 4,807,619 to Dyrud et al., U.S. Pat. No. 4,883,547 to Japuntich, U.S. Pat. No. 5,307, 796 to Kronzer et al., and U.S. Pat. No. 5,374,458 to Burgio. As shown in these patents, the nonwoven fibrous electret web is used as a filter in the cub-shaped mask body. The electret filter media also may be used, for example, in a filter cartridge for a respirator, such as the filter cartridge disclosed in U.S. Pat. No. Re. 35,062 to Brostrom et al. or in U.S. Pat. No. 5,062,421 to Burns and Reischel. Mask 50 thus is presented for illustration purposes only, and use of the present electret filter media is not limited to the embodiment disclosed.

Applicants believe that the present charging method deposits both positive and negative charge onto the fibers such that the positive and negative charge is randomly dispersed throughout the web. Random charge dispersal produces an unpolarized web. Thus, a nonwoven fibrous electret web produced in accordance with the present invention may be substantially unpolarized in a plane normal to the plane of the web. Fibers that have been charged in this manner ideally exhibit the charge configuration shown in FIG. 5C of U.S. patent application Ser. No. 08/865,362. If the fibrous web is also subjected to a corona charging operation, it would exhibit a charge configuration similar to the configuration shown in FIG. 5B of that patent application. A web, formed from fibers charged solely using the present method, typically has unpolarized trapped charge throughout the volume of the web. "Substantially unpolarized trapped charge" refers to a fibrous electret web that exhibits less than 1 $\mu C/m^2$ of detectable discharge current using TSDC analysis, where the denominator is the electrode surface area. This charge configuration can be shown by subjecting the web to thermally-simulated discharge current (TSDC).

Thermally-stimulated discharge analysis involves heating an electret web so that the frozen or trapped charge regains mobility and moves to some lower energy configuration to generate a detectable external discharge current. For a discussion on thermally-stimulated discharge current, see Lavergne et al., *A review of Thermo-Stimulated Current*, IEEE ELECTRICAL INSULATION MAGAZNE, vol. 9, no. 2, 5–21, 1993, and Chen et al., *Analysis of Thermally Stimulated Process*, Pergamon Press, 1981.

An electric charge polarization can be induced in a web that has been charged according to the present invention by elevating the temperature to some level above the glass transition temperature ($T_g$) of the polymer, which is the temperature where a polymer changes to a viscous or rubbery condition from a hard and relatively-brittle one. The glass-transition temperature, $T_g$, is below the polymer's melting point ($T_m$). After raising the polymer above its $T_g$, the sample is cooled in the presence of a DC electric field to freeze-in the polarization of the trapped charge. Thermally-stimulated discharge currents can then be measured by reheating the electret material at a constant heating rate and measuring the current generated in an external circuit. An instrument useful for performing the polarization and subsequent thermally-stimulated discharge is a Solomat TSC/ ARMA model 91000 with a pivot electrode, distributed by TherMold Partners, L. P., Thermal Analysis Instruments of Stamford, Conn.

The discharge current is plotted on the y axis (ordinate) against the temperature on the x axis (abscissa). The peak (current maximum) position and shape of the discharge current are characteristics of the mechanism by which the charges have been stored in the electret web. For electret webs that contain a charge, the peak maximum and shape are related to the configuration of the charge trapped in the electret material. The amount of charge produced in the outside circuit due to movement of the charge inside the electret web to a lower energy state upon heating can be determined by integrating the discharge peak(s).

Fibrous electret webs of the invention exhibit a Measured Charge Density, which is a measure of the relative amount of unpolarized trapped charge. The Measured Charge Density can be ascertained using the procedure described below. Fibrous electret webs of the invention preferably exhibit a Measured Charge Density of at least 0.3 microcoloumbs per square meter ($\mu C/m^2$), more preferably a Measured Charge Density of at least 0.6 $\mu C/m^2$, and still more preferably at least 0.9 $\mu C/m^2$. In some instances, Measured Charge Density can exceed 7 $\mu C/m^2$.

Advantages and other properties and details of this invention are further illustrated in the following Examples. Although the examples serve this purpose, the particular ingredients and amounts used and other conditions are not to be construed in a manner that would unduly limit the scope of this invention. For example, while the Examples illustrate inventive methods that produce products on an individual basis, the processes can also be performed continuously. The Examples selected for disclosure below are merely illustrative of how to make a preferred embodiment of the invention and how the articles may generally perform.

EXAMPLES

Sample Preparation

The nonwoven web was prepared generally as described by Van A. Wente, 48 INDUS. & ENGN. CHEM. 1342–46 (1956). The thermoplastic resin was ESCORENE 3505G polypropylene (available from Exxon Corp.) unless otherwise specified. The extruder was a Berstorff 60 millimeter (mm), 44 to 1, eight barrel zone, co-rotating twin screw extruder. When an additive was incorporated in the resin, it was prepared as a 10–15 weight % concentrate in a Werner Pfleiderer 30 mm, 36 to 1 corotating twin screw extruder. The water was purified by reverse osmosis and deionization. The basis weight of the web was about 54–60 grams/meter$^2$, unless otherwise specified.

DOP Penetration and Pressure Drop Test

The DOP Penetration and Pressure Drop Test was performed by forcing dioctyl phthalate (DOP) 0.3 micrometer mass median diameter particles through a sample of the nonwoven web which is 11.45 centimeter (4.5 inches) diameter at a rate of 42.5 liters/minute. The face velocity on the sample was 6.9 centimeters per second (cm/s). The DOP particles were generated using a TSI No. 212 sprayer (available from TSI of St. Paul, Minn.) with four orifices and 207 kilo pascals (kPa) (30 psi) of clean air at a concentration of between about 70 and about 110 milligrams/meter$^3$. The samples were exposed to the aerosol of DOP particles for 30 seconds. The penetration of the DOP particles through the samples was measured using an optical scattering chamber, Percent Penetration Meter Model TPA-8F available from Air Techniques Inc. of Baltimore, Md. The pressure drop (ΔP) across the sample was measured using an electronic manometer and reported in millimeters of water.

The DOP penetration and pressure drop values were used to calculate a quality factor "QF value" from the natural log (1n) of the DOP penetration by the following formula:

$$QF[1/\text{mm } H_2O] = -(\ln((DOP \text{ Pen }\%)/100))/\Delta AP[\text{mm } H_2O]$$

All samples tested below were tested for an Initial Quality Factor, $QF_i$.

As indicated above, higher initial QF values are indicative of better filtration performance.

Measured Charge Density

Electric charge polarizations were induced in four samples of each web by (i) heating each sample to a temperature of 100° C., (ii) poling each sample in the presence of a DC field of 2.5 kilovolts per millimeter (KV/mm) at 100° C. for poling periods of 5, 10, 15 or 20 minutes, and (iii) cooling each sample to −50° C. in the presence of the DC field to "freeze" the trapped and poled charge in the web. Each web sample was then reheated so that the frozen charge regained mobility and moved to a lower energy state, generating a detectable external discharge current. Specifically, after poling in the DC field mentioned above, each web sample was reheated from about −50° C. to about 160° C. at a heating rate of about 3° C./minute. The external current generated was measured as a function of temperature. The uncorrected measured charge density of each sample was determined by calculating the area under the discharge peaks and dividing the result by the area of the sample. The uncorrected measured charge density of each web was set equal to highest value of uncorrected measured charge density among the four samples analyzed for each web. Polarization and subsequent thermally-stimulated discharge was performed using a Solomat TSC/RMA Model 91000 with a pivot electrode, distributed by TherMold Partners, L.P., Thermal Analysis Instruments of Stanford, Conn. The measured charge density arising from trapped, unpolarized charge can be determined by analyzing an untreated web of the same composition and physical characteristics. The measured charge density of the treated web is determined by subtracting the uncorrected measured charge density of the untreated from the uncorrected measured charge density of the treated web.

Example 1 and Comparative Examples C1–C2

A nonwoven web that contained blown polypropylene microfibers was prepared as described above using ESCORENE 3505G polypropylene (available from Exxon Corp.). The effective fiber diameter of the samples was about 8–9 µm. Individual samples about 22 inches by about 11 inches (55.9 cm by 27.9 cm) were cut from this web. One sample was soaked in isopropanol, removed, hung up in a fume hood while excess isopropanol dripped off. The sample was then immersed in about 8 liters of deionized water for about 10 to 20 minutes, removed, passed through a wringer to remove excess water, and air dried overnight. Comparative sample C1 was soaked in isopropanol, removed, passed through a wringer, and air dried overnight. Comparative sample C2 was unwetted.

Circular samples about 5.25 inches in diameter (13.3 cm) were cut from the samples and were subjected to the DOP Penetration and Pressure Drop Test using the center 4.5 inches (11.4 cm) of each circle. $QF_i$ was calculated for each sample as described above. The results of the two evaluations conducted for each web sample were averaged and are given in Table 1.

TABLE 1

Effect of Aqueous Treatment on Filtration Performance

| Example | Treatment | Pressure Drop (mm water) | Penetration (%) | $QF_i$ (mm $H_2O)^{-1}$ |
|---|---|---|---|---|
| 1 | Isopropanol; Water | 2.68 | 33.2 | 0.41 |
| C1 | Isopropanol | 2.72 | 82.9 | 0.069 |
| C2 | None | 2.48 | 83.4 | 0.073 |

The data show that the nonwoven web of Example 1 wetted with isopropanol followed by saturation with water demonstrated a significantly higher Initial Quality Factor than the comparative samples.

Samples according to Examples 1, C1 and C2 were reproduced and evaluated for Quality Factor and Measured Charge Density as described above.

TABLE 2

Measured Charge Density

| Example | Treatment | $QF_i$ (mm $H_2O)^{-1}$ | Uncorrected Measured Charge Density ($\mu C/m^2$) | Measured Charge Density ($\mu C/m^2$) |
|---|---|---|---|---|
| 1 | Isopropanol; Water | 0.45 | 1.00 | 0.95 |
| C1 | Isopropanol | 0.09 | 0.07 | 0.02 |
| C2 | None | 0.09 | 0.05 | 0.0 |

The data of Table 2 show that the nonwoven web of Example 1 wetted with isopropanol, followed by saturation with water, demonstrated a significantly higher Initial Quality Factor and Measured Charge Density over the comparative examples.

Example 2 and Comparative Examples C3–C4

A web that contained blown polypropylene microfibers was prepared according to Example 1 and Comparative Examples C1–C2, except 1 weight % of a fluorochemical oxazolidinone additive, described in U.S. Pat. No. 5,411,576 as "Additive A," was added to the polypropylene melt prior to forming the blown microfibers. Additive A has the following formula:

The web also was annealed at about 140° C. for about 10 minutes. Samples were cut and were wetted as described in Example 1 and Comparative Examples C1–C2. All samples had an effective fiber diameter of about 8–9 µm and had a basis weight of about 57 grams/meter². Samples were cut and were evaluated for filtration performance as in the previous examples. The results of duplicate evaluations were averaged and are given in Table 3.

TABLE 3

Effect of Aqueous Treatment on Filtration Performance Polypropylene Plus Fluorochemical

| Example | Treatment | Pressure Drop (mm water) | Penetration (%) | $QF_i$ (mm $H_2O$)$^{-1}$ |
|---|---|---|---|---|
| 2 | Isopropanol; Water | 2.16 | 14.1 | 0.91 |
| C3 | Isopropanol | 2.11 | 42.2 | 0.41 |
| C4 | None | 2.10 | 85.9 | 0.072 |

The data of Table 3 show that the presence of the additive resulted in a higher Initial Quality Factor for the samples of Examples 2 and C3 than the Initial Quality Factor for the samples of Examples 1 and C1.

Samples according to Examples 2, C3, and C4 were reproduced and were evaluated for Initial Quality Factor and Measured Charge Density.

TABLE 4

Measured Charge Density for Fibers that Contained Polypropylene Plus Fluorochemical

| Example | Treatment | $QF_i$ (mm $H_2O$)$^{-1}$ | Uncorrected Measured Charge Density ($\mu C/m^2$) | Measured Charge Density ($\mu C/m^2$) |
|---|---|---|---|---|
| 2 | Isopropanol; Water | 0.72 | 16.6 | 7.65 |
| C3 | Isopropanol | 0.17 | 10.58 | 1.63 |
| C4 | None | 0.14 | 8.95 | 0.0 |

The data in Table 4 show that the nonwoven web of Example 2 wetted with isopropanol, followed by saturation with water, demonstrated a significantly higher Initial Quality Factor and Measured Charge Density than the web of Example 1 that did not contain the additive.

Example 3 and Comparative Examples C5–C6

A web that contained blown polypropylene microfibers was prepared as described in Example 1 and Comparative Examples C1–C2 except that about 0.5 wt % Chimassorb 944 LF was added to the polypropylene melt before forming the blown microfibers. Samples were cut and were wetted as described in Example 1 and Comparative Examples C1–C2. All samples had similar effective fiber diameters and basis weights. Samples were cut and were evaluated for filtration performance as in the previous examples. The results are given in Table 5.

TABLE 5

Effect of Aqueous Treatment on Filtration Performance Polypropylene Plus Chimassorb ™ 944

| Example | Treatment | Pressure Drop (mm water) | Penetration (%) | $QF_i$ (mm $H_2O$)$^{-1}$ |
|---|---|---|---|---|
| 3 | Isopropanol; Water | 2.56 | 53.3 | 0.25 |
| C5 | Isopropanol | 2.45 | 83.4 | 0.074 |
| C6 | None | 2.52 | 85.7 | 0.061 |

The data of Table 5 show that wetting the web in isopropanol followed by soaking in water and drying enhances the filtration performance of all three filter web samples relative to the unwetted samples. Example 3 shows that water can be used to enhance filtration performance of nonwoven polymeric webs. Example 3 did not show an improvement over Example 1, even though it contained the Chimassorb™ additive. This result is believed to have occurred because Chimassorb™ is soluble in isopropanol.

All the patents and patent applications cited above, including those discussed in the Background, are incorporated by reference into this document in total.

The present invention may be suitably practiced in the absence of any limitation not explicitly described in this document.

What is claimed is:

1. A method of making a fibrous electret web, which method comprises:
   wetting a fibrous web, which web contains nonconductive polymeric fibers, with a wetting liquid;
   saturating the wetted web in an aqueous polar liquid; and then
   substantially drying the web.

2. The method of claim 1, wherein the aqueous polar liquid is water.

3. The method of claim 2, wherein the water is purified, and wherein the web comprises a nonwoven fibrous web.

4. The method of claim 3, wherein the fibers are microfibers that contain polypropylene and an oily-mist performance enhancing additive.

5. The method of claim 1, wherein the fibrous electret web is capable of demonstrating a quality factor of at least 0.2 (mm $H_2O$)$^{-1}$ when tested according to the DOP Penetration and Pressure Drop Test.

6. The method of claim 1, wherein the fibrous electret web is capable of demonstrating a quality factor of at least 0.4 (mm $H_2O$)$^{-1}$ when tested according to the DOP Penetration and Pressure Drop Test.

7. The method of claim 1, wherein the fibrous electret web is capable of demonstrating a quality factor of at least 0.7 (mm $H_2O$)$^{-1}$ when tested according to the DOP Penetration and Pressure Drop Test.

8. The method of claim 1, wherein the fibers comprises about 1 wt % fluorochemical oxazolidinone and the fibrous electret web is capable of demonstrating a quality factor of at least 0.9 (mm $H_2O$)$^{-1}$ when tested according to the DOP Penetration and Pressure Drop Test.

9. The method of claim 1, wherein the polymeric fibers comprise an additive that is selected from the group consisting of a thermally-stable organic compound or oligomer containing at least one perfluorinated moiety, a thermally stable organic triazine compound or oligomer containing at least one nitrogen atom in addition to those in the triazine group, or a combination thereof, hindered amines, fluorochemical oxazolidinone, poly[[6-(1,1,3,3,-tetramethylbutyl) amino]-s-triazine-2,4-diyl][[(2,2,6,6-tetramethyl-4-piperidyl) imino] hexamethylene [(2,2,6,6-tetramethyl-4-piperidyl) imino]], or combination thereof.

10. The method of claim 1, wherein the fibers further comprise an oily-mist performance enhancing additive and wherein the method further comprises the step of annealing the fibrous web before to the step of wetting the web.

11. The method of claim 1, wherein the web comprises microfibers.

12. The method of claim 1, wherein fibers contain a fluorochemical additive in or on the fibers.

13. The method of claim 1, wherein the web is wetted by compressing the web and permitting the web to return to an uncompressed state while immersed in the wetting liquid.

14. The method of claim 1, wherein the web is wetted by directing a flow of the wetting liquid through the web.

15. The method of claim 1, wherein the web is wetted by sonically vibrating the wetting liquid while in contact with the web.

16. The method of claim 1, wherein the web is wetted by pressurizing the wetting liquid.

17. The method of claim 1, wherein the web is wetted by soaking the web in the wetting liquid.

18. The method of claim 1, further comprising the step of removing excess wetting liquid before saturating the web with the polar aqueous liquid.

19. The method of claim 1, wherein the web is saturated by compressing the web and permitting the web to return to an uncompressed state while being immersed in the aqueous polar liquid.

20. The method of claim 1, wherein the web is air dried.

21. The method of claim 1, wherein the web is dried by exposing the web to heat.

22. The method of claim 1, wherein the web is dried by exposing the web to a static vacuum.

23. The method of claim 1, wherein the web is dried by exposing the web to a stream of a heated drying gas.

24. The method of claim 1, wherein the web is dried by mechanically removing the polar aqueous liquid.

25. The method of claim 1, wherein the fibers comprise polypropylene, poly-4-methyl-1-pentene, or blends or copolymers containing one or both of these materials.

26. The method of claim 1, wherein the fibers comprise a polyolefin, polyvinylchloride, a polystyrene, a polycarbonate, a polyester, or a blend thereof.

27. The method of claim 1, wherein the fibrous electret web is substantially unpolarized in a plane normal to a plane of the web when subjected to thermally stimulated discharge.

28. The method of claim 1, wherein the fibrous electret web exhibits substantially no discharging current when subjected to thermally stimulated discharge.

29. The method of claim 1, wherein the fibrous electret web exhibits substantially no net charge.

30. The method of claim 1, wherein the web is a macroscopically homogeneous web.

31. The method of claim 1, wherein the fibrous electret web has an unpolarized charge.

32. The method of claim 1, wherein the web has a Measured Charge Density of at least 0.3 $\mu C/m^2$.

33. The method of claim 1, wherein the wetting liquid satisfies the Wetting Test within 5 seconds.

34. The method of claim 1, wherein the wetting liquid satisfies the Wetting Test within 2 seconds.

35. A filtration mask adapted to cover the nose and mouth of a wearer comprising the fibrous electret web of claim 1.

36. The method of claim 1, wherein the aqueous polar liquid has a dipole moment of at least 0.5 Debye.

37. The method of claim 1, wherein the aqueous polar liquid has a dipole moment of at least 0.75 Debye.

38. The method of claim 1, wherein the aqueous polar liquid has a dipole moment of at least 1 Debye.

39. The method of claim 1, wherein the aqueous polar liquid has a dielectric constant of at least 10.

40. The method of claim 1, wherein the aqueous polar liquid has a dielectric constant of at least 20.

41. The method of claim 1, wherein the aqueous polar liquid has a dielectric constant of at least 40.

42. The method of claim 1, wherein the aqueous polar liquid has a dipole moment of at least 0.5 Debye and has a dielectric constant of at least 10.

43. The method of claim 1, wherein the aqueous polar liquid has a dipole moment of at least 0.75 Debye and has a dielectric constant of at least 20.

44. The method of claim 1, wherein the aqueous polar liquid and the wetting agent do not leave a conductive, non-volatile residue on the fibrous electret web.

45. The method of claim 1, wherein the fibers have fluorine atoms on their surfaces.

46. The method of claim 42, wherein the resulting fibrous electret web is substantially unpolarized in a plane normal to the plane of the web.

* * * * *

UNITED STATES PATENT AND TRADEMARK OFFICE
CERTIFICATE OF CORRECTION

PATENT NO. : 6,406,657 B1
DATED : June 18, 2002
INVENTOR(S) : Eitzman, Philip D.

It is certified that error appears in the above-identified patent and that said Letters Patent is hereby corrected as shown below:

Column 3,
Line 30, "laqueous" should read as -- aqueous --

Column 13,
Line 8, "$\Delta AP$" should read -- $\Delta P$ --

Signed and Sealed this

Thirty-first Day of December, 2002

JAMES E. ROGAN
*Director of the United States Patent and Trademark Office*

(12) EX PARTE REEXAMINATION CERTIFICATE (9595th)

United States Patent
Eitzman et al.

(10) Number: US 6,406,657 C1
(45) Certificate Issued: Apr. 12, 2013

(54) METHOD AND APPARATUS FOR MAKING A FIBROUS ELECTRET WEB USING A WETTING LIQUID AND AN AQUEOUS POLAR LIQUID

(75) Inventors: Philip D. Eitzman, Lake Elmo, MN (US); Alan D. Rousseau, Stillwater, MN (US)

(73) Assignee: 3M Innovative Properties Company, St. Paul, MN (US)

Reexamination Request:
No. 90/011,567, Mar. 14, 2011

Reexamination Certificate for:
Patent No.: 6,406,657
Issued: Jun. 18, 2002
Appl. No.: 09/415,291
Filed: Oct. 8, 1999

Certificate of Correction issued Dec. 31, 2002

(51) Int. Cl.
*D06B 3/00* (2006.01)
*B01D 39/16* (2006.01)

(52) U.S. Cl.
USPC ........ 264/340; 264/436; 427/121; 427/434.4; 307/400

(58) Field of Classification Search .................... None
See application file for complete search history.

(56) References Cited

To view the complete listing of prior art documents cited during the proceeding for Reexamination Control Number 90/011,567, please refer to the USPTO's public Patent Application Information Retrieval (PAIR) system under the Display References tab.

*Primary Examiner* — Carlos Lopez (57) ABSTRACT

A method for imparting an electrostatic charge to a non-woven fibrous web 20. The fibrous web 20 is wetted with a wetting liquid 24, followed by being saturated with an aqueous polar liquid 30 and drying 31. The resulting dried product is an electret article 43 that could be used as an air filter in, for example, a respirator 50.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-4, 6-35 and 38-46 is confirmed.

Claims 5, 36 and 37 are determined to be patentable as amended.

5. The method of claim 1, wherein the fibrous electret web is capable of demonstrating a quality factor of at least 0.2 (mm $H_2O)^{-1}$ when tested according to the DOP Penetration and Pressure Drop Test, *and the method further comprises:*

*placing the resulting fibrous electret web in a respirator, a filter cartridge or an air filter.*

36. The method of claim 1, wherein the *method further comprises placing an additive on the fibrous web using a surface fluorination technique and the* aqueous polar liquid has a dipole moment of at least 0.5 Debye.

37. The method of claim 1, wherein the *method further comprises placing an additive on the fibrous web using a surface fluorination technique and the* aqueous polar liquid has a dipole moment of at least 0.75 Debye.

* * * * *